(12) United States Patent
Cambridge et al.

(10) Patent No.: US 8,782,084 B2
(45) Date of Patent: Jul. 15, 2014

(54) SYSTEM, METHOD, AND COMPUTER PROGRAM PRODUCT FOR CONDITIONALLY ALLOWING ACCESS TO DATA ON A DEVICE BASED ON A LOCATION OF THE DEVICE

(75) Inventors: Rodney Derrick Cambridge, Ruilsip (GB); Jonathan Dyton, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 325 days.

(21) Appl. No.: 12/415,653

(22) Filed: Mar. 31, 2009

(65) Prior Publication Data

US 2013/0246465 A1    Sep. 19, 2013

(51) Int. Cl.
*G06F 21/62* (2013.01)
*H04L 29/06* (2006.01)

(52) U.S. Cl.
CPC ............ *G06F 21/6218* (2013.01); *H04L 63/20* (2013.01)
USPC ................ 707/781; 707/783; 726/28; 726/1; 713/165

(58) Field of Classification Search
USPC ..................... 705/57; 707/783–788
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,119,247 A * | 9/2000 | House et al. | 714/38.14 |
| 6,460,050 B1 | 10/2002 | Pace et al. | |
| 6,944,451 B2 * | 9/2005 | Mukherjee et al. | 455/435.1 |
| 7,092,943 B2 * | 8/2006 | Roese et al. | 1/1 |
| 7,503,074 B2 * | 3/2009 | Dublish et al. | 726/27 |
| 7,506,155 B1 | 3/2009 | Stewart et al. | |
| 7,873,872 B1 * | 1/2011 | Shillington et al. | 717/124 |
| 8,161,522 B1 * | 4/2012 | Agrawal | 726/1 |
| 8,234,496 B1 * | 7/2012 | Ding et al. | 713/176 |
| 2006/0059096 A1 * | 3/2006 | Dublish et al. | 705/57 |
| 2009/0219209 A1 * | 9/2009 | Bush et al. | 342/450 |
| 2009/0287654 A1 * | 11/2009 | Sato et al. | 707/3 |
| 2010/0180332 A1 * | 7/2010 | Ben-Yochanan et al. | 726/12 |

OTHER PUBLICATIONS

Thibault Candebat, A Secure Artichecture enabling End-User Privacy in the context of Commercial Wide-Area Location-/n/hanced Web Service, Jul. 2005.*

* cited by examiner

*Primary Examiner* — Lewis A Bullock, Jr.
*Assistant Examiner* — Tina Huynh
(74) *Attorney, Agent, or Firm* — Patent Capital Group

(57) ABSTRACT

A system, method, and computer program product are provided for conditionally allowing access to data on a device based on a location of the device. In use, a location of a device storing data is identified. Furthermore, access to the data is conditionally allowed, based on the location.

17 Claims, 5 Drawing Sheets

SYSTEM, METHOD, AND COMPUTER PROGRAM PRODUCT FOR CONDITIONALLY ALLOWING ACCESS TO DATA ON A DEVICE BASED ON A LOCATION OF THE DEVICE

FIELD OF THE INVENTION

The present invention relates to data loss, and more particularly to data loss prevention.

BACKGROUND

Traditionally, data loss prevention systems have been utilized for preventing unwanted data loss (e.g. data leakage) with respect to unauthorized entities. Unfortunately, the traditional data loss prevention systems have exhibited various limitations in preventing data loss with respect to devices that are able to change locations.

Just by way of example, with respect to data loss prevention, mobile computer systems and devices are generally more difficult to secure than traditional desktop computers due to their mobile nature. Thus, such mobile computer systems can oftentimes be easily removed from a place deemed secure without being noticed. Once a mobile computer system is removed from a secure area, the information it contains may be considered to be at risk of unwanted data loss.

There is thus a need for addressing these and/or other issues associated with the prior art.

SUMMARY

A system, method, and computer program product are provided for conditionally allowing access to data on a device based on a location of the device. In use, a location of a device storing data is identified. Furthermore, access to the data is conditionally allowed, based on the location.

DETAILED DESCRIPTION

Figure 1:
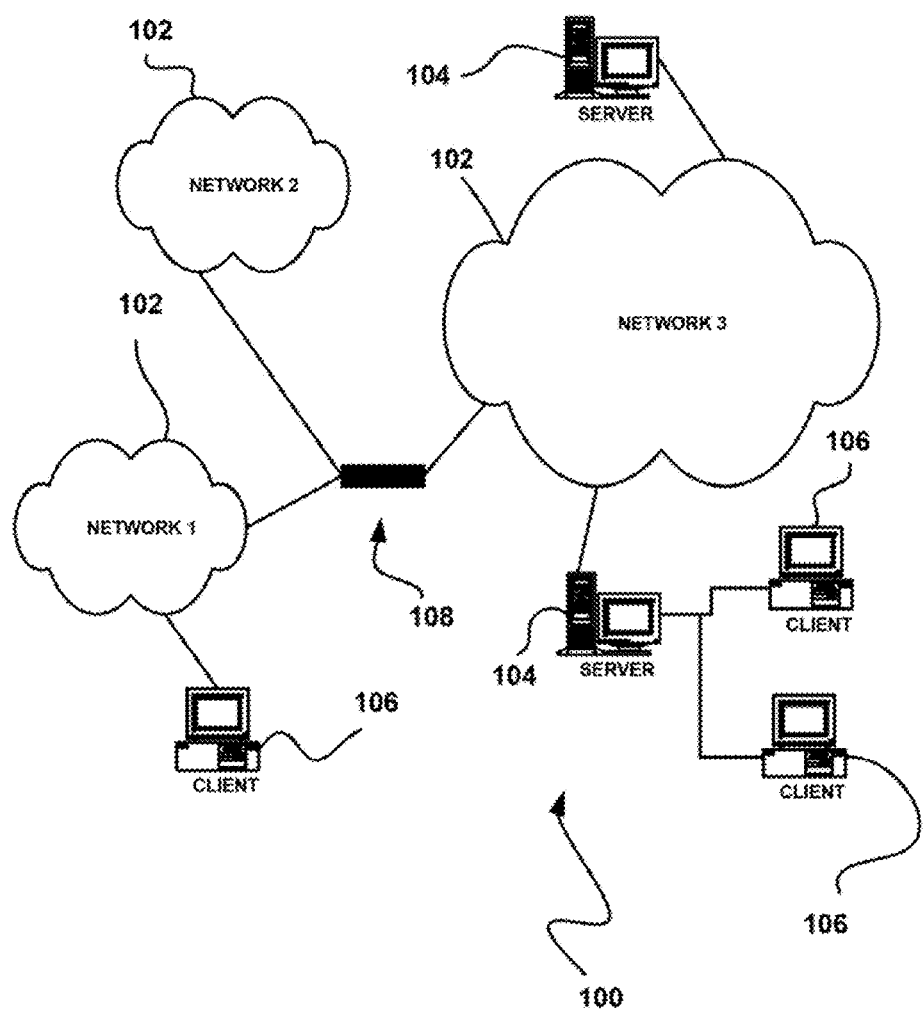
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
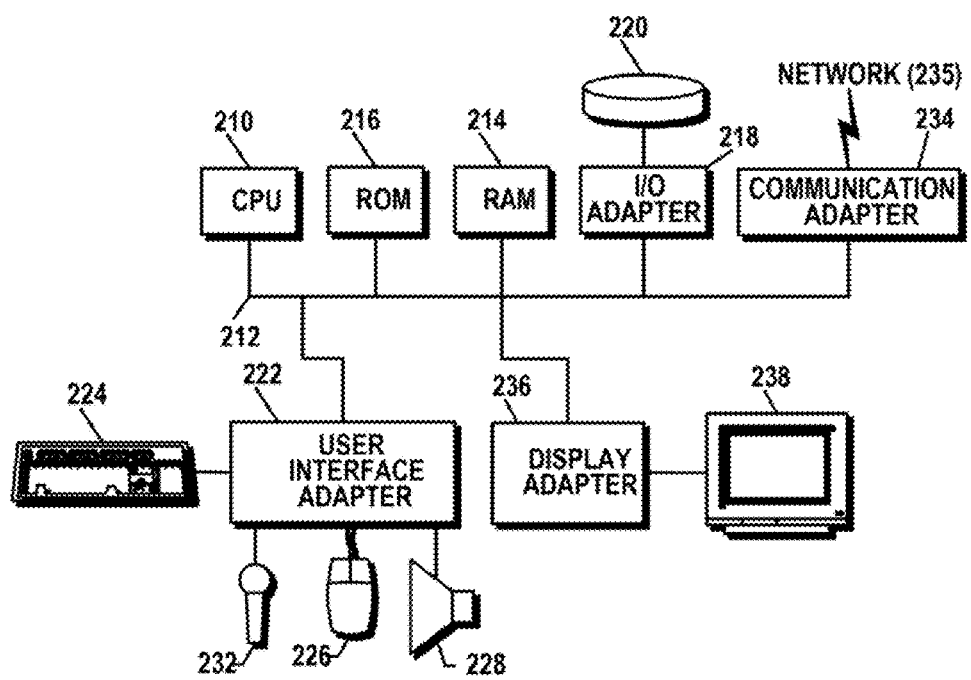
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of non-transitory logic may be utilized which is capable of implementing the various functionality set forth herein.

Figure 3:
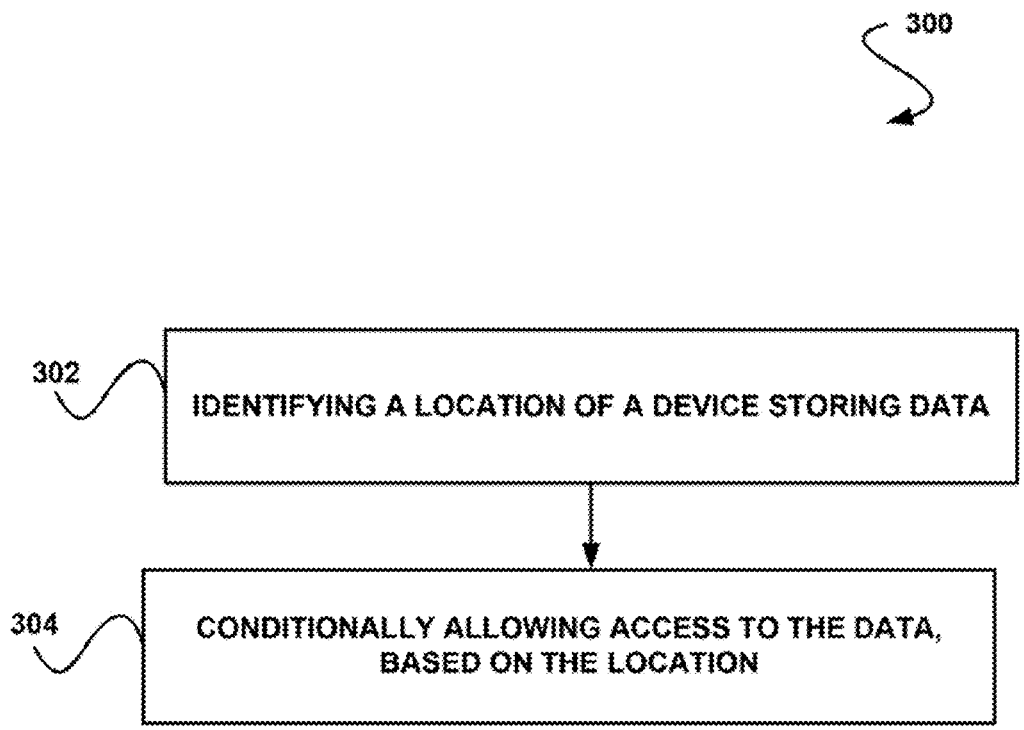
FIG. 3 shows a method for conditionally allowing access to data on a device based on a location of the device, in accordance with one embodiment.

FIG. 3 shows a method 300 for conditionally allowing access to data on a device based on a location of the device, in accordance with one embodiment. As an option, the method 300 may be carried out in the context of the architecture and environment of FIGS. 1 and/or 2. Of course, however, the method 300 may be carried out in any desired environment.

As shown in operation 302, a location of a device storing data is identified. With respect to the present description, the device may include any device capable of storing data for which a location may be identified. For example, the device may include a mobile device (e.g. such that the location thereof may be capable of changing). Thus, in various exemplary embodiments, the device may include a mobile phone, a PDA, and/or any of the other mobile devices described above with respect to FIGS. 1 and/or 2.

Additionally, the data stored on the device may include text, files, folders, databases, documents [e.g. portable document format (PDF) documents], spreadsheets, etc. In one embodiment, the data may include predetermined data. Optionally, the predetermined data may include data predetermined to be protected from unauthorized access. For example, the predetermined data may include data that is secured from data leakage, data for which data loss is to be prevented, etc. As another example, the predetermined data may include data that is predetermined to not necessarily be intended for use outside of a predetermined location, as described in more detail below.

In another embodiment, the data may include confidential, sensitive, etc. data. Such confidential, sensitive, etc. data may include data that is proprietary to an organization, personally identifying data (e.g. social security number, bank account information, passwords, etc.), financial data, etc. Of course, however, the data may include any type of data for which access thereto is to be conditionally allowed.

As an option, the data may be stored in a predetermined area of the device. In one embodiment, the predetermined area may include a predefined portion of memory of the device. For example, the predetermined area may include a database, a folder, etc. As another example, the predetermined area may include a predefined portion of memory that is secure, such that access to the data stored therein may be conditionally prevented, the reasons for which will be set forth in more detail below with respect to operation 304.

To this end, the data may optionally be stored in a secured portion of memory of the device. Optionally, the secured portion of memory may include an encrypted portion of memory (e.g. an encrypted folder, etc.). Accordingly, the data may be encrypted, in one embodiment. Of course, the data may optionally be secured in any desired manner.

Further, the location of the device may be identified in any desired manner. In one embodiment, the location of the device may be identified by the device. For example, an application, system, etc. of the device may identify the location of the device. In another embodiment, however, the location of the device may be identified by another device (e.g. a server, etc.) in communication with the device via a network.

As an option, a framework (e.g. a software framework) that is built into the device may be utilized for identifying the location of the device. Just by way of example, the device may include Google's™ Android™ phone which may also include the framework capable of being utilized for identifying the location of the device. As another example, the device may include Apple® Computer, Inc.'s iPhone™ which uses a core location framework that is built in to the operating system of the iPhone™ in order to determine the location of the iPhone™. With respect to the present embodiment, the core location framework may be included in a core services layer of the operating system of the iPhone™

In one embodiment, the framework of the device may identify the location of the device by triangulating its position using signal information, such as (nearby) cellular phone towers and known Wi-Fi™ hotspots (e.g. locations where Wi-Fi™ is available). As another option, the location of the device may be identified utilizing a global positioning system (GPS). Such GPS may be located on the device, just by way of example.

Further, the location of the device may include any geographical area at which the device is located. In various embodiments, the geographical area may include an address, a zip code, a room in a building, a city block, a building, a campus including multiple buildings (e.g. owned by a single entity), coordinates (e.g. latitude and longitude), etc. To this end, the location of the device may be identified at a predetermined level of exactness, such as a zip code, coordinates, an address, a room of a building, etc.

Moreover, as shown in operation 304, access to the data is conditionally allowed, based on the location. With respect to the present description, the access may include reading (e.g. viewing) the data, writing to the data, printing the data, transmitting the data to an external device (e.g. coupled to the device, over a network, etc.), etc.

In one embodiment, the access to the data may be allowed if the location includes a predetermined location. In another embodiment, the location of the device may be compared to a list of predetermined locations. For example, the list of predetermined locations may be stored on the device. Thus, if the location of the device matches one of the predetermined locations, as a result of the comparison, the access to the data may be allowed, for example.

It should be noted that the predetermined location may include a location predetermined to be secure, for example. In one embodiment, the predetermined location may include a location where the data is predetermined to not necessarily be susceptible to loss, leakage, unauthorized access, etc. For example, the predetermined location may include a particular address, zip code, room in a building, city block, building, campus including multiple buildings (e.g. owned by a single entity), coordinates (e.g. a latitude and longitude), etc. To this end, the access to the data may be allowed in response to a determination that the location of the device is a location where the data is predetermined to not necessarily be susceptible to loss, leakage, unauthorized access, etc.

Optionally, the predetermined location may be configured by an administrator. For example, the administrator may utilize a management system for indicating the predetermined location(s). The management system may optionally be located on a server that is in communication with the device via a network, as another example. Accordingly, the management system may transmit information identifying the predetermined location(s) to the device, such that the device may compare the location of the device to the predetermined locations(s), as noted above. In one embodiment, the device may include a configuration utility which enables the device to be configured with a policy and settings indicating the predetermined location(s) at which the data stored on the device may be accessed.

As another option, a graphical user interface may be utilized for configuring the predetermined location. For example, the graphical user interface may depict a map. Further, the administrator may configure the predetermined location by selecting an area on the map, such that the selected area is the predetermined location. As another option, the graphical user interface may depict a blueprint of a building via which the administrator may select the predetermined location. Of course, the administrator may also configure the predetermined location by manually inputting an address, etc.

In one embodiment, the access to the data may be allowed by automatically decrypting the data. In another embodiment, the access to the data may be allowed by storing the data in another area of the device. For example, the access to the data may be allowed by storing the data in an unprotected area of the device (e.g. a non-encrypted area, etc.).

In yet another embodiment, the access to the data may be allowed by transmitting a key for decrypting the data to the device (e.g. from a server, via a network, etc.) for allowing the device to decrypt the data. Of course, however, the key may also already be stored on the device. For example, the key stored on the device may be made available for use by the device upon a determination that the location of the device includes a predetermined location.

While various examples of allowing access to the data have been described above, it should be noted that the access to the data may be allowed in any desired manner. For example, the access to the data may optionally only be allowed based on the location of the device and a predefined timeframe (e.g. a predefined time of day, etc.). In one embodiment, the access to the data may only be allowed if the location of the device is a predefined location and if a time the access is requested is during a predefined timeframe (e.g. predefined business hours, etc.). It should also be noted that the access to the data may be conditionally allowed based on the location of the device and any other desired parameters (e.g. as set by a policy, etc.).

In one exemplary embodiment, two devices may be required to be in the same geographical location (e.g. within a predetermined vicinity of one another) for the data stored on at least one of the devices to become available. Thus, access to the data may be conditionally allowed, based on whether the location of one of the devices is a same geographical location as the other device.

For example, at least one of two devices (e.g. belonging to two individuals, such as colleagues, etc.) may include protected (e.g. encrypted) data which may be made available (e.g. decrypted) upon entry of the device into a secure location. In addition, the protected data may also be made available as a result of the two devices being located in the same physical location, whether or not the physical location is predetermined to be secure.

In this way, the secure location may be predetermined as a certain physical location, or may be predetermined as a location that may change (e.g. where the devices with the protected data only have to be within a predetermined number of feet, meters, etc. of each other). For example, protected data stored on at least one of two devices may be made available for use on an airplane if the two devices are located on the same airplane. However, if one of the devices is lost in baggage or stolen, the protected data may become inaccessible as a result of the two devices no longer being in the same physical location.

In another embodiment, the access to the data may be prevented if the location is outside of the predetermined location. Just by way of example, if the device is not located at any one of the predetermined locations, the access to the data may be denied, blocked, etc. As another example, As an option, the access to the data may be prevented by preventing decryption of the data. As another option, the access to the data may be prevented by deleting the data from the device. As yet another option, the access to the data may be prevented by removing the data from the device and storing the data on another remote device (e.g. a server, etc.), such as via a network, etc.

In one exemplary embodiment, a location of the device may be continuously polled, periodically polled, etc. In another exemplary embodiment, a location of the device may be identified in response to a request (e.g. by a user, an application of the device, a remote application, etc.) to access the data. To this end, upon a determination (e.g. resulting from the polling, resulting from the request, etc.) that the device is located at a predetermined location, access to the data (e.g. the secured data, etc.) may be allowed. However, upon a determination (as a result of the polling) that the device is not located at a predetermined location (e.g. is outside of a predetermined location), the access to the data may be prevented, terminated if already established, etc.

As an option, a data loss prevention system (e.g. of the device) may continually query an application, interface, etc. (e.g. such as a core location framework) utilized for identifying a location of the device. For example, the data loss prevention system may continually query an operating system of the device to identify the location of the device. Upon receipt of an identification of the location of the device, the data loss prevention system may compare the location of the device to a predetermined location.

If the data loss prevention system determines, based on the comparison, that the device is at a predetermined location, the data stored on the device may be made available for access via the data loss prevention system. For example, the data may be decrypted as a result of the determination that the device is at a predetermined location. As another example, the decrypted data may be presented (e.g. displayed) via the device to a user.

However, if the data loss prevention system determines, based on the comparison, that the device is not at a predetermined location, the data stored on the device may be prevented from being accessed (via the data loss prevention system). Optionally, the data may be prevented from being accessed by preventing a decryption of the data, preventing the data from being displayed via the device, etc.

As another option, if access to the data was allowed as a result of the device being located at a predetermined location, and the device subsequently moves to another location that is not a predetermined location, the access to the data may be automatically terminated. The access to the data may be terminated, for example, by deleting the data from the device, by deleting a decrypted version of the data from the device and maintaining an encrypted version of the data on the device, by removing the data from the device and storing the data on a remote device, by encrypting the decrypted data, etc.). As yet another option, if access to the data was prevented as a result of the device not being located at a predetermined location, and the device subsequently moves to another location that is a predetermined location, the access to the data may be automatically allowed (e.g. enabled, etc.). In various embodiments, the access to the data may be allowed by decrypting the data, creating a decrypted version of the data on the device, etc.

To this end, the data loss prevention system may conditionally allow the access to the data, based on the location of the device. In one embodiment, the data loss prevention system may include a plug-in. For example, the data loss prevention system may be capable of plugging into the device (e.g. a commercially available device), etc. As another example, the data loss prevention system may be capable of plugging into the device via an interface of an operating system of the device, where the interface is used to communicate with a system (e.g. GPS) of the device utilized for identifying a location of the device.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
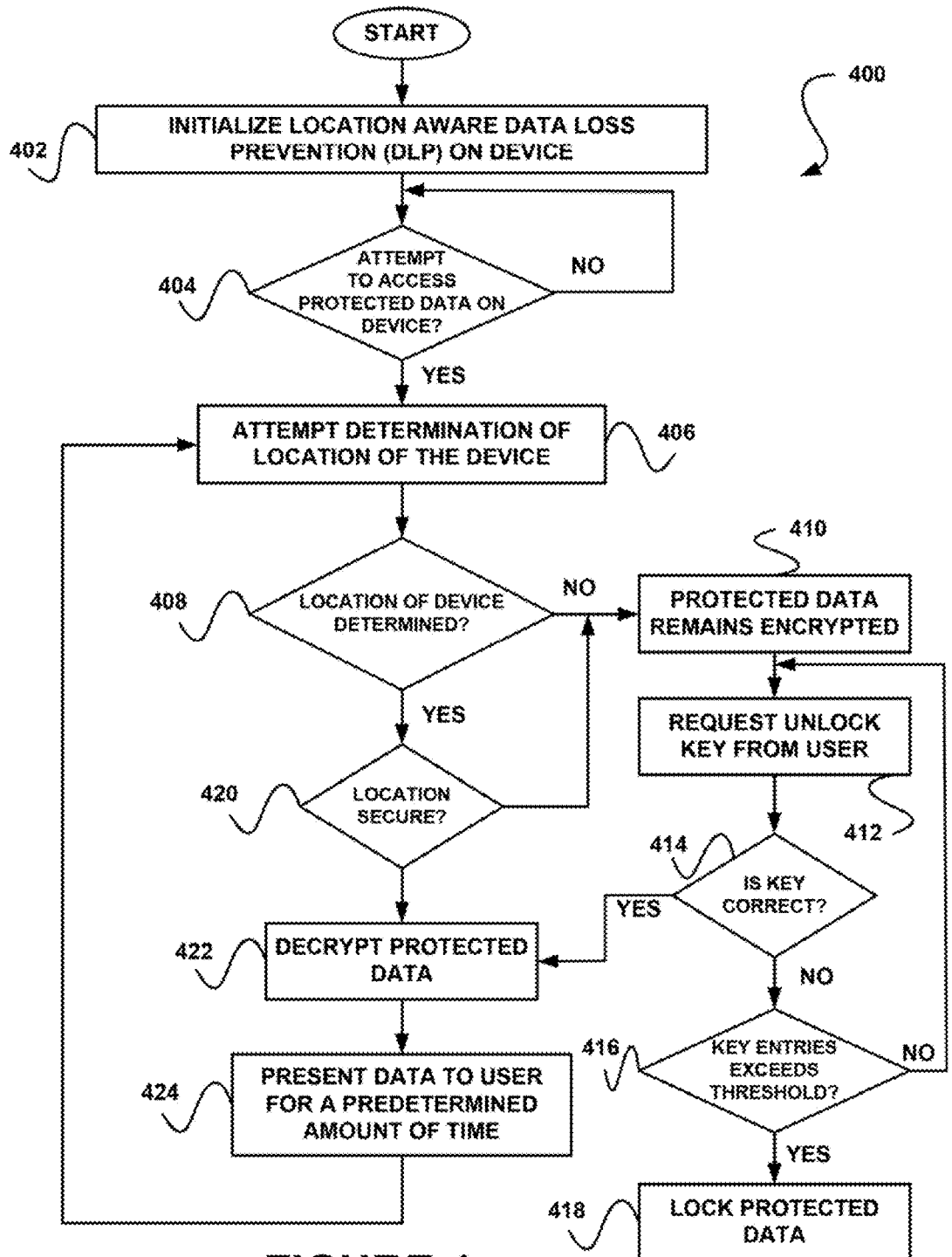
FIG. 4 shows a method for conditionally decrypting data on a device based on a location of the device, in accordance with another embodiment.

FIG. 4 shows a method 400 for conditionally decrypting data on a device based on a location of the device, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, location aware data loss prevention (DLP) is initialized on a device. With respect to the present embodiment, the location aware DLP may be utilized for conditionally decrypting data on a device based on a location of the device. Optionally, the location aware DLP may be initialized upon boot-up of the device, upon an operating system of the device being loaded, etc.

Additionally, it is determined whether protected data on the device is attempted to be accessed, as shown in decision 404. With respect to the present embodiment, the protected data may include encrypted data. As an option, the protected data may be stored in a folder secured by the location aware DLP (e.g. secured via an encryption of the folder).

Further, the attempted access to the protected data may include a request to access the data. Such request may include a request to read the data, write to the data, etc. In one embodiment, the determination may be made by the location aware DLP. In another embodiment, protected data on the device may be monitored for identifying access attempts associated with the protected data.

If it is determined that the protected data on the device is not attempted to be accessed, the method 500 continues to wait for the protected data on the device to be attempted to be accessed. If, however, it is determined that the protected data on the device is attempted to be accessed, a location of the device is attempted to be determined. Note operation 406.

Attempting to determine the location of the device may include requesting a location of the device from a system, application, framework, etc. capable of being utilized to identify the location of the device. For example, a GPS of the device may be queried for the location of the device. Further, it is determined whether the location of the device has been determined, as shown in decision 408.

If the location of the device has not been determined (e.g. by virtue of an error with the system, application, framework, etc. capable of being utilized to identify the location of the device), the protected data remains encrypted, as shown in operation 410. In addition, an unlock key is requested from a user, as shown in operation 412. The user may include the user of the device, for example. As another example, the unlock key may be requested from the user via an interface of the device.

With respect to the present embodiment, the unlock key may include any predetermined key specifically utilized to access the protected data. For example, the unlock key may be predetermined by the location aware DLP. It is determined in decision 414 whether the unlock key entered by the user is correct. For example, the unlock key entered by the user may be compared to the unlock key predetermined by the location aware DLP, such that a match may indicate that the unlock key entered by the user is correct.

If it is determined that the unlock key entered by the user is correct, the protected data is decrypted. Note operation 422. In one embodiment, the protected data may be decrypted automatically utilizing a decrypting key stored on the device. In another embodiment, the decryption key may be transmitted to the device (e.g. via a network), such as to the location aware DLP of the device, in order for the device to decrypt the protected data.

Still yet, the decrypted data is presented to the user for a predetermined amount of time, as shown in operation 424. In one embodiment, the decrypted data may be presented to the user for a particular time period (e.g. designated in minutes, hours, etc.). In another embodiment, the decrypted data may be presented to the user until a location of the device is determined, and the determined location is a location not necessarily predetermined to be secure.

If it is determined in decision 414 that the unlock key entered by the user is not correct, it is determined whether a number of times the user has entered the unlock key exceeds a threshold. Note decision 416. For example, a counter may be utilized to determine the number of times the user has entered the unlock key. Further, the number of times the user has entered the unlock key may be compared to the threshold for determining whether the number of times the user has entered the unlock key exceeds the threshold.

In response to a determination that the number of times the user has entered the unlock key does not exceed the threshold, the unlock key is again requested from the user (in operation 412). However, in response to a determination that the number of times the user has entered the unlock key exceeds the threshold, the protected data is locked, as shown in operation 418. The protected data may be locked for a predetermined amount of time, as an option. In one embodiment, the protected data may be locked from access for a particular time period (e.g. designated in minutes, hours, etc.). In another embodiment, the protected data may be locked from access until a location of the device is determined, and the determined location is a location that is predetermined to be secure.

If it is determined in decision 408 that the location of the device is determined, it is further determined whether the location is a location that is predetermined to be secure, as shown in decision 420. For example, the location may be compared to a list of locations that are predetermined to be secure. In response to a determination that the location is not a location that is predetermined to be secure, the protected data remains encrypted (operation 410), and the protected data is only made accessible via entry of the unlock key by the user (operation 412, etc.).

In this way, the protected data may be allowed to be accessed via entry of the unlock key even when the device is in a location that is not predetermined to be secure. Still yet, in response to a determination that the location is a location that is predetermined to be secure, the protected data is decrypted (operation 422) and presented to the user for the predetermined amount of time (operation 424).

Figure 5:
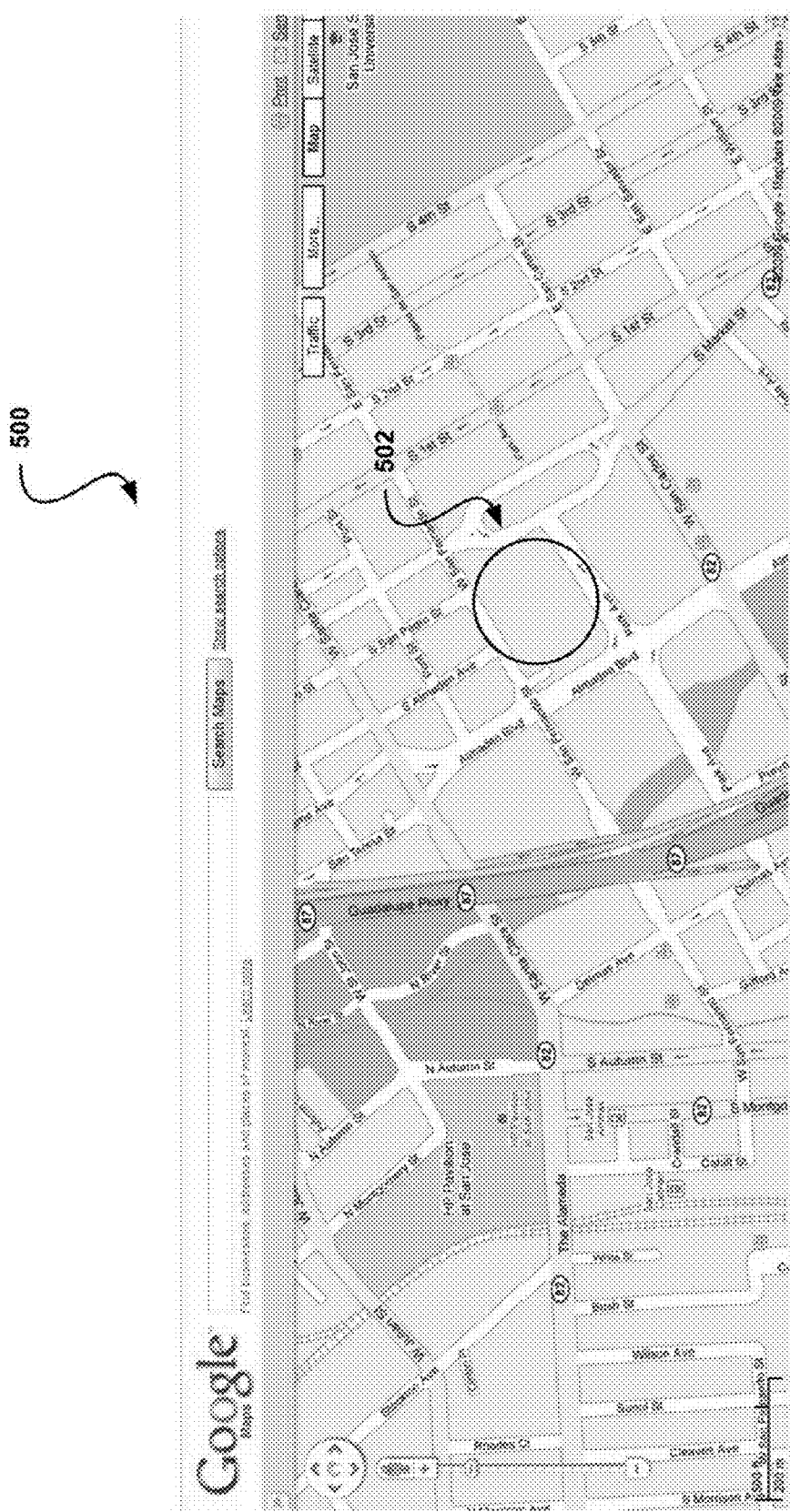
FIG. 5 shows a graphical user interface for configuring a predetermined location at which access to data on a device is allowed, in accordance with yet another embodiment.

FIG. 5 shows a graphical user interface (GUI) 500 for configuring a predetermined location at which access to data on a device is allowed, in accordance with yet another embodiment. As an option, the GUI 500 may be implemented in the context of the architecture and environment of FIGS. 1-4. Of course, however, the GUI 500 may be implemented in any desired environment. Again, it should be noted that the aforementioned definitions may apply during the present description.

As shown, the GUI 500 depicts a map showing a plurality of street names, city blocks, etc. As shown, the GUI 500 may employ existing map resources, such as Google Maps™, Yahoo® maps, etc. for depicting the map. With respect to the present embodiment, a user (e.g. administrator) may utilize the GUI 500 to select a location for configuring the location as a predetermined location. Thus, the user may indicate a location as a predetermined location such that when a device is in the location, access to the data on the device is allowed. Thus, the user may configure predefined locations via the GUI 500.

In one embodiment, the GUI 500 may include a tool for use by the user to depict a boundary 502. The boundary 502 may enclose an area for allowing the user to configure a predetermined location that includes the enclosed area. Thus, the enclosed area may include a predetermined location within which access to the data on the device is allowed. Thus, if the device is within the boundary 502, access to the data on the device may be allowed.

While not shown, it should be noted that the GUI 500 may also optionally depict buildings. The buildings may be selectable, in one embodiment, such that the user may select the buildings for indicating at which building the access to the data on the device is to be allowed. In another embodiment, the user may draw a boundary around the buildings at which access to the data on the device is to be allowed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory medium for performing operations, comprising:
   initiating a data loss prevention (DLP) system provided on a device, the DLP system configured for preventing data leakage associated with personally identifying data associated with passwords specific to a user of the device, wherein the data is stored in a secured portion of a memory of the device in an encrypted form;
   determining a location of the device, which is configured for storing data, using a core location framework that is built into a core services layer of an operating system of the device, wherein the core location framework is configured to determine the location of the device based upon received signal information indicative of the location of the device;
   when the location of the device is determined:
      comparing the location to a list of predetermined geographic locations for which access to the data of the device is allowed, wherein the list includes specific buildings for which access to the data of the device is to be allowed;
      identifying a particular time of day for which access to the data is being requested; and
      allowing access to the data by decrypting the data from the secured portion of the memory, based on determining that the location is secure, and based on identifying that the particular time of day is authorized for accessing the data; and
   when the location of the device is not determined:
      requesting a predetermined key from the user;
      determining a correctness of the predetermined key from the user by comparing the predetermined key from the user to a predetermined key determined by the DLP system to indicate that the predetermined key from the user is correct;
      allowing access to the data by decrypting the data from the secured portion of the memory based on determining that the predetermined key from the user is correct, and based on identifying that the particular time of day is authorized for accessing the data; and
      blocking access to the data in response to determining that the predetermined key from the user is not correct and determining whether a number of times the user has incorrectly entered the predetermined key exceeds a threshold.

2. The computer program product of claim 1, wherein the device includes a mobile device.

3. The computer program product of claim 2, wherein the mobile device includes a mobile phone.

4. The computer program product of claim 1, wherein the data includes predetermined data.

5. The computer program product of claim 4, wherein the predetermined data includes data predetermined to be protected from unauthorized access.

6. The computer program product of claim 1, wherein the computer program product is operable such that the location of the device is identified utilizing a global positioning system of the device.

7. The computer program product of claim 1, wherein the location includes a geographical area at which the device is located.

8. The computer program product of claim 7, wherein the geographical area includes an address.

9. The computer program product of claim 1, wherein the computer program product is operable such that the predetermined locations are configured by an administrator.

10. The computer program product of claim 9, wherein the computer program product is operable such that the administrator configures the predetermined locations by selecting an area on a graphical user interface depicting a map.

11. The computer program product of claim 1, wherein the computer program product is operable such that the access to the data is prevented if the location is outside of a predetermined location.

12. The computer program product of claim 1, wherein the computer program product is operable such that the access to the data is allowed by automatically decrypting the data.

13. The computer program product of claim 1, wherein the computer program product is operable such that the access to the data is allowed by transmitting a key for decrypting the data to the device via a network.

14. The computer program product of claim 1, wherein the computer program product is operable such that the data loss prevention system of the device conditionally allows the access to the data.

15. A method, comprising:
   initiating a data loss prevention (DLP) system provided on a device, the DLP system configured for preventing data leakage associated with personally identifying data associated with passwords specific to a user of the device, wherein the data is stored in a secured portion of a memory of the device in an encrypted form;
   determining a location of the device, which is configured for storing data, using a core location framework that is built into a core services layer of an operating system of the device, wherein the core location framework is configured to determine the location of the device based upon received signal information indicative of the location of the device;
   when the location of the device is determined:
      comparing the location to a list of predetermined geographic locations for which access to the data of the device is allowed, wherein the list includes specific buildings for which access to the data of the device is to be allowed;
      identifying a particular time of day for which access to the data is being requested; and
      allowing access to the data by decrypting the data from the secured portion of the memory, based on determining that the location is secure, and based on identifying that the particular time of day is authorized for accessing the data; and
   when the location of the device is not determined:
      requesting a predetermined key from the user;
      determining a correctness of the predetermined key from the user by comparing the predetermined key from the user to a predetermined key determined by the DLP system to indicate that the predetermined key from the user is correct;
      allowing access to the data by decrypting the data from the secured portion of the memory based on determining that the predetermined key from the user is correct, and based on identifying that the particular time of day is authorized for accessing the data; and
      blocking access to the data in response to determining that the predetermined key from the user is not correct and determining whether a number of times the user has incorrectly entered the predetermined key exceeds a threshold.

16. A system, comprising:
   a processor, the system being configured for:
      initiating a data loss prevention (DLP) system provided on a device, the DLP system configured for preventing data leakage associated with personally identifying data associated with passwords specific to a user of the device, wherein the data is stored in a secured portion of a memory of the device in an encrypted form;

determining a location of the device, which is configured for storing data, using a core location framework that is built into a core services layer of an operating system of the device, wherein the core location framework is configured to determine the location of the device based upon received signal information indicative of the location of the device;

when the location of the device is determined:
  comparing the location to a list of predetermined geographic locations for which access to the data of the device is allowed, wherein the list includes specific buildings for which access to the data of the device is to be allowed;
  identifying a particular time of day for which access to the data is being requested; and
  allowing access to the data by decrypting the data from the secured portion of the memory, based on determining that the location is secure, and based on identifying that the particular time of day is authorized for accessing the data; and when the location of the device is not determined:
  requesting a predetermined key from the user;
  determining a correctness of the predetermined key from the user by comparing the predetermined key from the user to a predetermined key determined by the DLP system to indicate that the predetermined key from the user is correct;
  allowing access to the data by decrypting the data from the secured portion of the memory based on determining that the predetermined key from the user is correct, and based on identifying that the particular time of day is authorized for accessing the data; and
  blocking access to the data in response to determining that the predetermined key from the user is not correct and determining whether a number of times the user has incorrectly entered the predetermined key exceeds a threshold.

17. The system of claim 16, wherein the processor is coupled to a memory via a bus.

* * * * *